US008005171B2

(12) United States Patent
Lakkis (10) Patent No.: US 8,005,171 B2
(45) Date of Patent: Aug. 23, 2011

(54) SYSTEMS AND METHOD FOR GENERATING A COMMON PREAMBLE FOR USE IN A WIRELESS COMMUNICATION SYSTEM (75) Inventor: Ismail Lakkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1084 days.

(21) Appl. No.: 11/425,964

(22) Filed: Jun. 22, 2006

(65) Prior Publication Data

US 2007/0019710 A1 Jan. 25, 2007

Related U.S. Application Data (60) Provisional application No. 60/692,909, filed on Jun. 22, 2005.

(51) Int. Cl.
H04L 27/06 (2006.01)
(52) U.S. Cl. .......................... 375/343; 375/267; 375/260
(58) Field of Classification Search .................. 375/343, 375/267
See application file for complete search history.

(56) References Cited

U.S. PATENT DOCUMENTS

| 6,473,467 | B1 * | 10/2002 | Wallace et al. ................ 375/267 |
| 7,184,719 | B2 * | 2/2007 | Roberts ......................... 455/103 |
| 7,254,202 | B2 | 8/2007 | Cattaneo et al. |
| 7,447,232 | B2 | 11/2008 | Stephens et al. |
| 2003/0058972 | A1 * | 3/2003 | Iochi ............................. 375/343 |
| 2004/0142663 | A1 * | 7/2004 | Roberts ........................... 455/73 |
| 2004/0156390 | A1 | 8/2004 | Prasad et al. |
| 2004/0240597 | A1 * | 12/2004 | Cattaneo et al. .............. 375/354 |
| 2005/0105505 | A1 | 5/2005 | Fishler et al. |

OTHER PUBLICATIONS

Antweiler, M. "Cross-correlation of p-ary GMW sequences," IEEE Transactions on Information Theory, vol. 40, No. 4, Jul. 1994, pp. 1253-1261.
Gong, Guang et al., "Cryptographic properties of the Welch-Gong transformation sequence generators," Information Theory, IEEE Transactions on, vol. 48, Issue 11, Nov. 2002, pp. 2837-2846, Digital Object Identifier 10.1109/TIT.2002.804043.
International Search Report—PCT/US06/024244, International Search Authority—US, Jan. 16, 2007.
Written Opinion—PCT/US06/024244, International Search Authority—US, Jan. 16, 2007.
International Preliminary Report on Patentability—PCT/US06/024244, The International Bureau of WIPO—Geneva, Switzerland, Dec. 24, 2007.
X. Chang, Z. Dai, and G. Gong, "Some cryptographic properties of exponential functions," in Advances in Cryptology Asia CRYPT'94. (Lecture Notes in Computer Science), Berlin, Germany: Springer-Verlag, 1994, vol. 917, pp. 415-418.

* cited by examiner

Primary Examiner — Chieh M Fan
Assistant Examiner — Santiago Garcia
(74) Attorney, Agent, or Firm — Dang M. Vo (57) ABSTRACT A UWB system comprising a plurality of piconets, wherein each piconet uses a different code to generate a preamble for use in communicating with a plurality of remote communication devices. The preamble can be generated from the combination of repeated versions of the code, negative versions of the code, and no code or zero, the codes used have a perfect autocorrelation function and optimal cross-correlation.

23 Claims, 6 Drawing Sheets

FIG. 1

| s1 | +0++000-+-++00++0+00-0000-0+0-- | s12 | -00-++++0+-+000+0-0++0-0000+-00 |
| --- | --- | --- | --- |
| s2 | +-0+0+00+000+0++---0-+00-++0000 | s13 | +-+000+0-0++0-0000+-00-00-++++0 |
| s3 | +00+000+0++---0-+00-++0000+-0+0 | s14 | ++0000+-0+0+00+000+0++---0-+00- |
| s4 | ++---0-+00-++0000+-0+0+00+000+0 | s15 | 0-00-++++0+-+000+0-0++0-0000+-0 |
| s5 | +0++---0-+00-++0000+-0+0+00+000 | s16 | 0000+-0+0+00+000+0++---0-+00-++ |
| s6 | -0++0-0000+-00-00-++++0+-+000+0 | s17 | +-0+0+00+000+0++---0-+00-++0000 |
| s7 | ++---0-+00-++0000+-0+0+00+000+0 | s18 | +000+0++---0-+00-++0000+-0+0+00 |
| s8 | -0-+00-++0000+-0+0+00+000+0++-- | s19 | 00+00-0-0++0000--+00-+0++-++0+0 |
| s9 | +0000+-0+0+00+000+0++---0-+00-+ | s20 | ++0+000+00-0-0++0000--+00-+0++- |
| s10 | +0+000+00-0-0++0000--+00-+0++-+ | s21 | 0++0-0000+-00-00-++++0+-+000+0- |
| s11 | 0+-00-00-++++0+-+000+0-0++0-000 | | |

| s1 | 0000+++-++-0+0+0-00++00-++0+--0-00+0+++000+-0+++-0-+0-0--0--00+00<br>+000+-+0000+0-++--00+0+0+--00--0+000-00+-+-000-0-0000++00000+00 |
|---|---|
| s2 | -00+++0+-0+++0+00+00+0-+000--+00+0000-0-++00000++0-0000000-00---<br>+++-000-0-0+0-+++00+-00-0+000+000+-0000--+-0--+-+0+0-+0+0+00-+0- |
| s3 | 0-+---0+000-0-+00-0++----000+000000+-00+-0++000+--+00+-+0-0---0000+0<br>0+-00000+0+0+0++0-00-00+0-00++++00-000++0-0+0000+++-++-0+-+0-- |
| s4 | 000+00+-00000+0+0+0++0-00-00+0-00++++00-000++0-0+0000+++-++-0<br>+-+0--0-+--0+000-0-+00-0++----000+000000+-00+-0++000+--+00+-+0-0---0 |
| s5 | -000000-00---+++-000-0-0+0-+++00+-00-0+000+000+-0000--+-0--+-+0+0-<br>+0+0+00-+0--00+++0+-0+++0+00+00+0-+000--+00+0000-0-++00000++0 |
| s6 | +0+0+00-+0--00+++0+-0+++0+00+00+0-+000--+00+0000-0-++00000++0-<br>000000-00---+++-000-0-0+0-+++00+-00-0+000+000+-0000--+-0--+-+0+0- |
| s7 | +00-0++---000+000000+-00+-0++000+--+00+-+0-0---0000+00+-00000+0+0<br>+0++0-00-00+0-00++++00-000++0-0+0000+++-++-0+-+0--0-+---0+000-0- |
| s8 | 00000-0-0+0+-0+00-00-0+00--++00-000-+0-0-0000+++++++0+-+0++0-+--<br>0+000+0+-00-0++-+-000+000000-+00-+0-+000+---00+++0-0+--0000-00++ |
| s9 | --00+++0-0+--0000-00++00000-0-0+0+-0+00-00-0+00--++00-000-+0-0-00<br>00+++++++0+-+0++0-+---0+000+0+-00-0++-+-000+000000-+00-+0-+000+ |
| s10 | -0+0+-0+00-00-0+00--++00-000-+0-0-0000+++++++0+-+0++0-+---0+000+0<br>+-00-0++-+-000+000000-+00-+0-+000+---00+++0-0+--0000-00++00000-0 |

SYSTEMS AND METHOD FOR GENERATING A COMMON PREAMBLE FOR USE IN A WIRELESS COMMUNICATION SYSTEM

RELATED APPLICATIONS INFORMATION

The application claims priority under 35 U.S.C. 119(e) to U.S. Provisional Application No. 60/692,909, entitled "Systems and Methods for Generating a Common Preamble For Use In a Wireless Communication System," filed Jun. 22, 2005, which is incorporated herein by reference as if set forth in full

BACKGROUND

1. Field of the Invention

The embodiments described herein are directed to UWB systems and more a particularly to reducing interference between multiple piconets in a UWB system.

2. Background of the Invention

Recently Ultra Wide Band (UWB) has been promoted as a solution that can bring the convenience and mobility of wireless communications to many applications that require high-speed interconnections. Other conventional wireless communication technology is limited in that it cannot provide the high-speed interconnects required for many short-range wireless applications that can enable, e.g., connection of multiple devices for transmission of video, audio, and other high-bandwidth data, thus freeing people from the wires normally associated with such applications.

A conventional UWB system works by transmitting lots of short pulses across a very wide spectrum of frequencies up to several gigahertz in bandwidth. An UWB receiver then translates the pulses into data by listening for a familiar pulse sequence sent with the transmission. Conventional UWB is defined as any radio technology occupying a spectrum bandwidth that is greater than 20% of the center frequency, or a bandwidth of at least 500 megahertz. UWB combines the broad spectrum with low power to improve speed and reduce interference with other wireless spectra. As a result, UWB provides significant channel capacity over short ranges and limited interference with other systems operating in the same area.

While UWB promises to provide systems with data rates as high as 1 GHz, UWB systems are also envisioned that operate at lower data rates, such as data rates in the hundreds of megahertz. For example, one proposal defines a Frequency Division Multiplex (FDM) system that divides the available spectrum into three bands, with each band having a 500 MHz bandwidth. Preferably, multiple piconets would be able to operate within each band; however, use of such Simultaneous Operating Piconets (SOPs) can result in interference between the piconets. Further, it can be preferable to allow different types of devices to communicate with a given piconet. For example, it can be preferable that devices comprising coherent receivers as well as non-coherent receivers, and even differentially coherent receivers, to all communicate with the same piconet. This would allow users to trade-off cost versus performance in deciding what type of device to purchase and use. For example, if lower performance is acceptable, but cost is the driving issues, then the user could purchase a device including a non-coherent receiver. On the other hand, if performance is the driving factor, then the user would be free to purchase a better performing device, i.e., one that uses a coherent receiver.

Unfortunately, conventional UWB devices and technology are not capable of sufficiently limiting SOP interference, nor do they allow multiple devices to speak with the same piconet.

SUMMARY

A UWB system comprising a plurality of piconets, wherein each piconet uses a different code to generate a preamble for use in communicating with a plurality of remote communication devices. The preamble can be generated from the combination of repeated versions of the code, negative versions of the code, and no code or zero.

In one aspect, the codes used have a perfect autocorrelation function.

In another aspect, the codes used have optimal cross-correlation.

These and other features, aspects, and embodiments of the invention are described below in the section entitled "Detailed Description."

BRIEF DESCRIPTION OF THE DRAWINGS

Features, aspects, and embodiments of the inventions are described in conjunction with the attached drawings, in which.

DETAILED DESCRIPTION

The systems and methods described herein are directed to a packet structure for a UWB system that includes a common preamble that can be detected and used for acquisition by coherent, non-coherent, and differentially coherent devices. Further, the defined packet structure and preamble can allow SOPs, while limiting interference between SOPs. It is assumed that a UWB system implementing the packet structure defined herein will include impulse radios. Thus, each transmission will comprise a series of very short pulses. Impulse radios are well known and will not be discussed herein for the sake of brevity.

Figure 1:
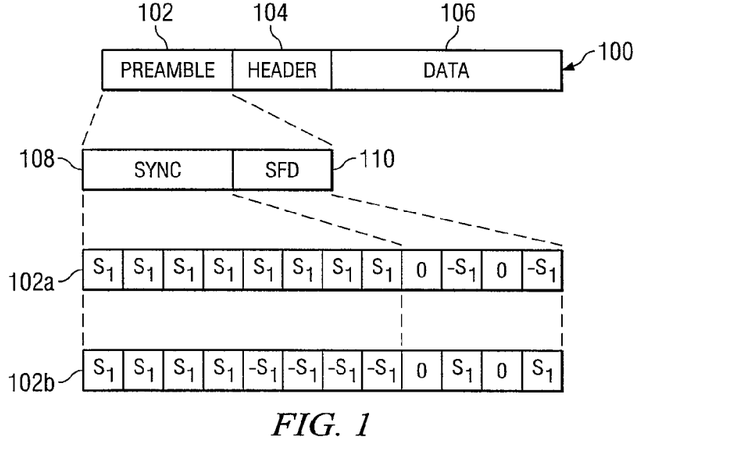
FIG. 1 is a diagram illustrating an example packet structure in accordance with one embodiment.

FIG. 1 is a diagram illustrating an example packet structure 100 for use in a UWb system configured in accordance with one embodiment described herein, the packet structure 100 defined herein includes a preamble 102, a header 104, and the payload, or data 106. The preamble 102 can then be divided into a sync portion 108, configured to allow a receiver to acquire a piconet, and a start frame delimiter (SFD) 110 that can be used to indicate the end of the preamble. FIG. 1 also illustrates two-example preamble structures 102a and 102b. As can be seen, the sync portion 108 of the preamble 102 is derived by repeating a certain code (S1) a certain number of times. Each piconet operating within a particular frequency band can have its own unique code. The stop frame deliminator 110 is then constructed using zeros, or the absence of a code, the code, and negative versions of the code as illustrated.

In order to allow the three different types of devices described above to each acquire and communicate with the piconet effectively and efficiently, only specific codes can be used. These codes should have a perfect auto-correlation function and an optimal cross-correlation function. Further, because the codes, e.g., code S1, are repeated periodically as illustrated, the code should actually have a perfect periodic, auto-correlation function and an optimal periodic, cross-correlation function. Methods for developing such codes are described in more detail below.

In the example preamble structure 102a and 102b it can be seen that an equal number of negative codes and positive codes are used. Such a configuration can be preferable because it limits the effect that the signal will have on other piconets operating in the same frequency band by limiting the amount of noise energy that such a signal will add for other piconets operating in the same frequency band.

It has been determined that codes used for the preamble of a frame structure as described herein should be perfect ternary sequences that have perfect periodic, auto-correlation, i.e., zero side lobes, and optimum periodic, cross-correlation. Optimum periodic, cross-correlation is defined as a cross-correlation that results in a peak that is no larger than the square root of the auto-correlation peak. Moreover, the code should have approximately half zeros. Thus, for example, a code of length 31 can comprise 15 zeros, which means the auto-correlation peak will be 16 and the cross-correlation peak should be no greater than 4. The code sequence should also be as large as possible to support multiple piconets per frequency band and to mitigate co-channel interference. Specific examples of code sequence sets, their auto-correlation function and their cross-correlation function are described in more detail below.

The following description illustrates one example method for generating a code that meets the above requirements for use in a packet structure as described herein. The code length should be $2^N-1$ wherein N is an odd number. Further, there should be $2^{N-1}-1$ zeros. Thus, for example, if N is equal to 5, then the code will be a length 31 and comprise 15 zeros. If N is equal to 7, then the code length will be 127 and comprise 63 zeros.

With these requirements in mind, the code can then be generated by first selecting all preferred pairs of maximum length sequences, or m-sequences. A preferred pair of m-sequences is defined as 2 m-sequences that are $2^N-1$ in length and that have the lowest periodic, cross-correlation possible.

The periodic, cross-correlation for a given preferred pair of m-sequences should be a 3-level signal, wherein the levels are equal to $$-1, -1+2^{\frac{N+1}{2}}, -1-2^{(N+1)/2}.$$

As an example, if N is equal to 1, then each of the m-sequences in a preferred pair of m-sequences will have a length of 31 and the levels will be $-1$, 7, and $-9$.

Next, the value 1 should be added to the periodic cross-correlation level values. Thus, in the example above, the levels would then be 0, 8 and $-8$ after a 1 has been added. Next, the values should be divided $2^{(N+1)/2}$. In the example above, this would mean dividing the levels by the value of 8, which would give the levels 0, 1 and $-1$.

Thus, in the example method described here, all perfect ternary sequences are generated from all preferred pairs of m-sequences. The perfect ternary sequences with optimal cross-correlation can then be used in the preamble of a packet structure as described herein. Again, optimal cross-correlation is defined as the square root of the auto-correlation function; however, defined in another way, optimal cross-correlation is defined as all perfect sequence in which the cross-correlation is $2^{(N+1)/2}$. For example, for N=5, optimal cross correlation would be 4. For N=7, the optimum class correlation would be 8.

Figure 2:
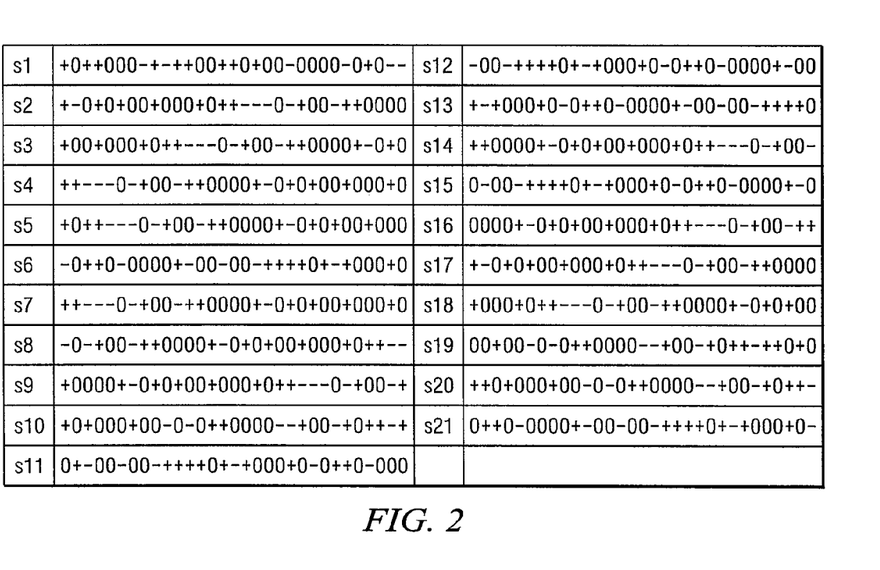
FIG. 2 is a diagram illustrating an set of codes of length 31 used to in the packet structure of FIG. 1.
Figure 3:
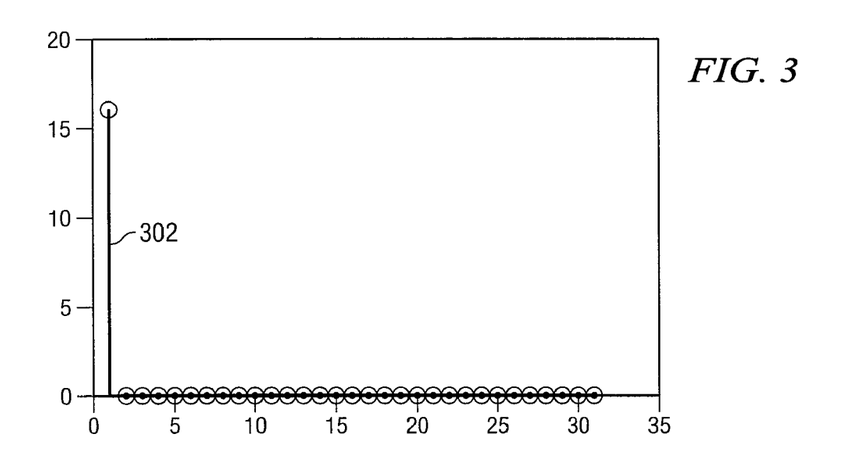
FIG. 3 is a diagram illustrating the auto-correlation function for the codes of FIG. 2 for a coherent receiver.
Figure 4:
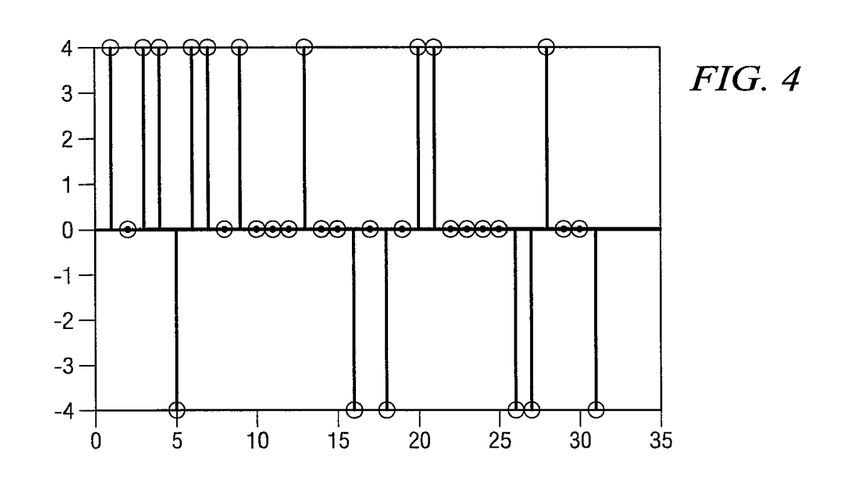
FIG. 4 is a diagram illustrating the cross-correlation function for the set of codes of FIG. 2 for a coherent receiver.

FIG. 2 is chart illustrating an example set of perfect ternary sequences of length 31 generated as described above. FIG. 3 is a diagram illustrating the autocorrelation function 302 for the set of codes illustrated in FIG. 2 for a coherent receiver. FIG. 4 is a diagram illustrating the cross-correlation function for the set of codes illustrated in FIG. 2 for a coherent receiver. As can be seen, the cross-correlation function is not larger than the square root of the auto correlation function. Accordingly, the cross-correlation function illustrated in FIG. 4 is a periodic, cross-correlation function.

Figure 5:
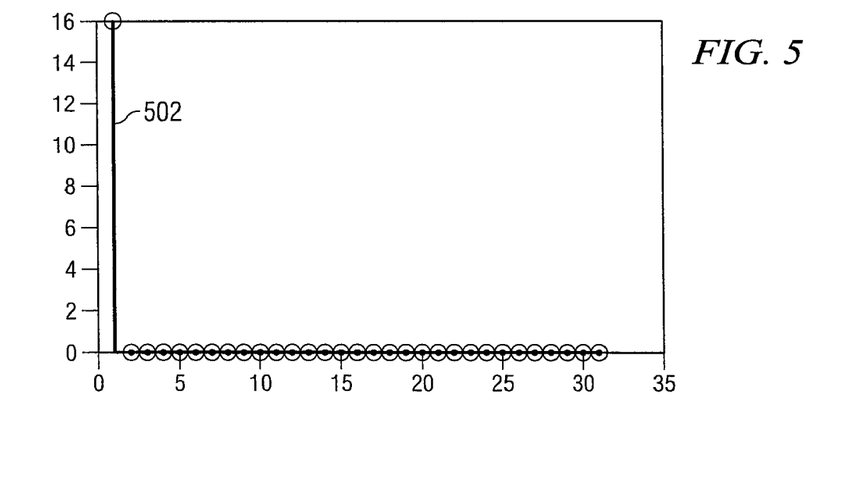
FIG. 5 is a diagram illustrating the auto-correlation function for the codes of FIG. 2 for a non-coherent receiver.
Figure 6:
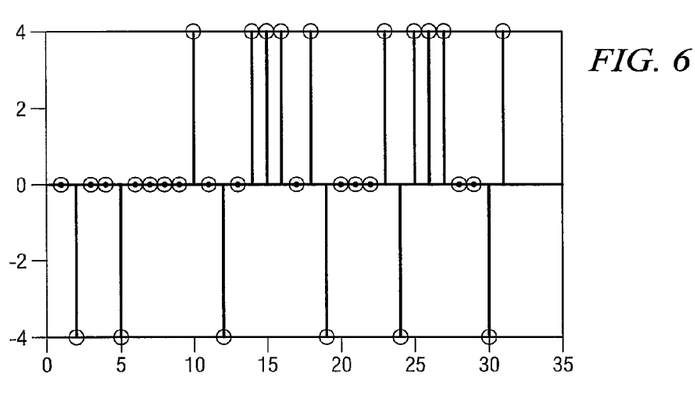
FIG. 6 is a diagram illustrating the cross-correlation function for the set of codes of FIG. 2 for a non-coherent receiver.

FIG. 5 is a diagram illustrating an example auto-correlation function 502 for the set of codes illustrated in FIG. 2 for a non-coherent receiver. FIG. 6 is a diagram illustrating the cross-correlation function for the set of codes illustrated in FIG. 5 for a coherent receiver. As can be seen, the cross-correlation function is not larger than the square root of the auto correlation function. Accordingly, the cross-correlation function illustrated in FIG. 5 is a periodic, cross-correlation function.

Figure 7:
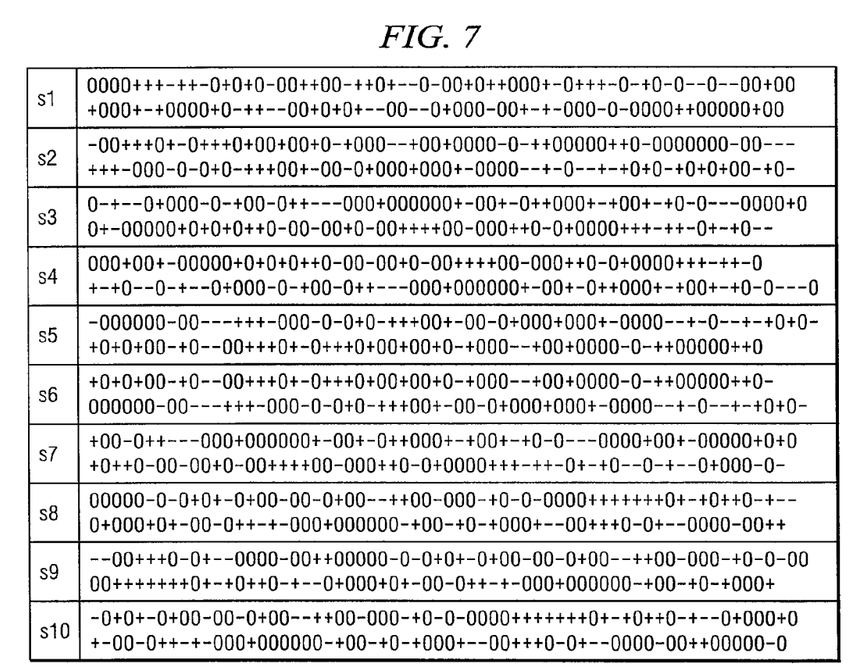
FIG. 7 is a diagram illustrating an set of codes of length 127 used to in the packet structure of FIG. 1.
Figure 8:
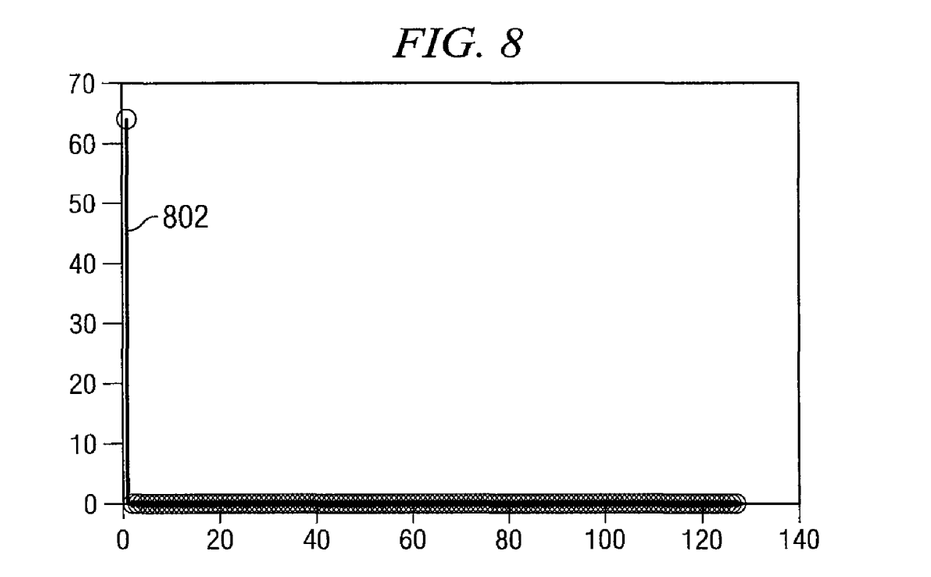
FIG. 8 is a diagram illustrating the auto-correlation function for the codes of FIG. 7 for a coherent receiver.
Figure 9:
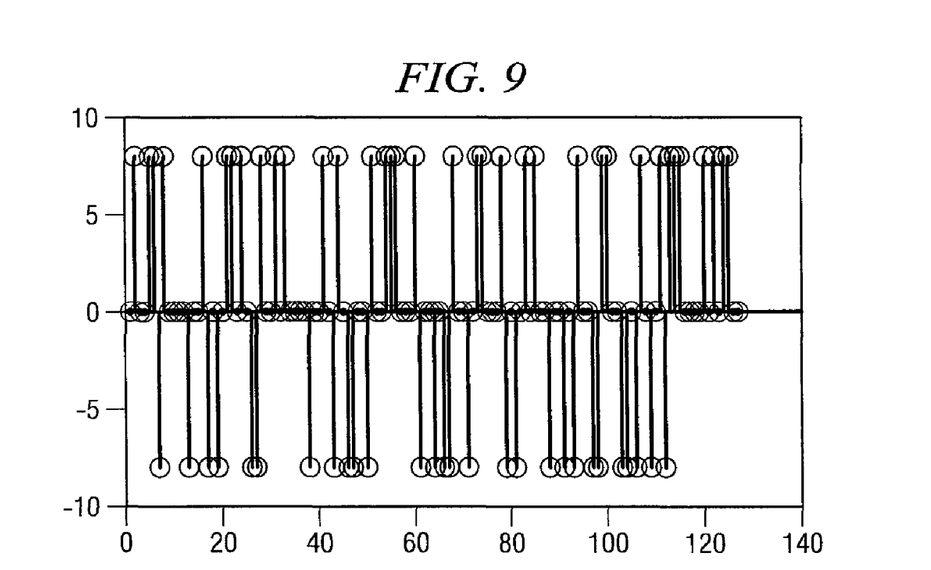
FIG. 9 is a diagram illustrating the cross-correlation function for the set of codes of FIG. 7 for a coherent receiver.

FIG. 7 is chart illustrating an example set of perfect ternary sequences of length 127 generated as described above. FIG. 8 is a diagram illustrating the autocorrelation function 802 for the set of codes illustrated in FIG. 7 for a coherent receiver. FIG. 9 is a diagram illustrating the cross-correlation function for the set of codes illustrated in FIG. 7 for a coherent receiver. As can be seen, the cross-correlation function is not larger than the square root of the auto correlation function. Accordingly, the cross-correlation function illustrated in FIG. 9 is a periodic, cross-correlation function.

Figure 10:
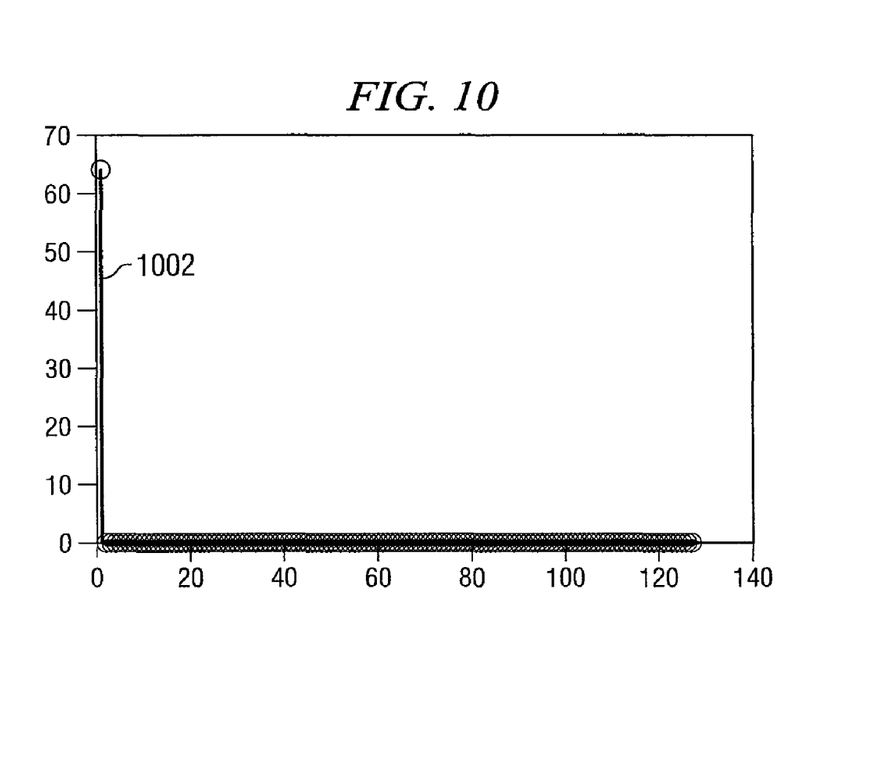
FIG. 10 is a diagram illustrating the auto-correlation function for the codes of FIG. 7 for a non-coherent receiver.
Figure 11:
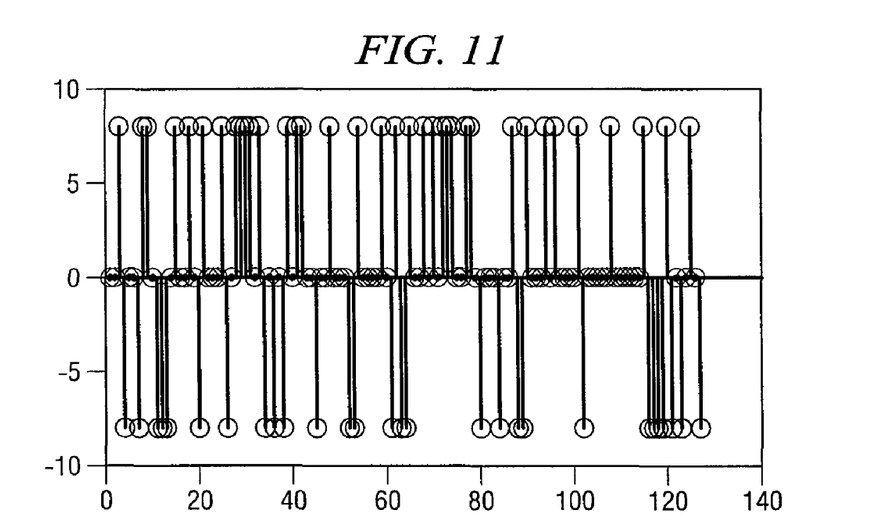
FIG. 11 is a diagram illustrating the cross-correlation function for the set of codes of FIG. 7 for a non-coherent receiver.

FIG. 10 is a diagram illustrating an example auto-correlation function 1002 for the set of codes illustrated in FIG. 7 for a non-coherent receiver. FIG. 11 is a diagram illustrating the cross-correlation function for the set of codes illustrated in FIG. 7 for a coherent receiver. As can be seen, the cross-correlation function is not larger than the square root of the auto correlation function. Accordingly, the cross-correlation function illustrated in FIG. 7 is a periodic, cross-correlation function.

Figure 12:
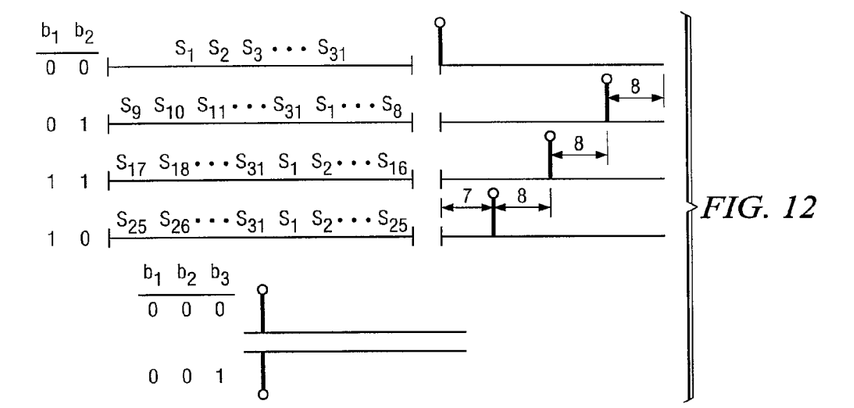
FIG. 12 is a diagram illustrating a modulation technique that can employed in a system that uses the packet structure of FIG. 1 in accordance with one embodiment.
Figure 13:
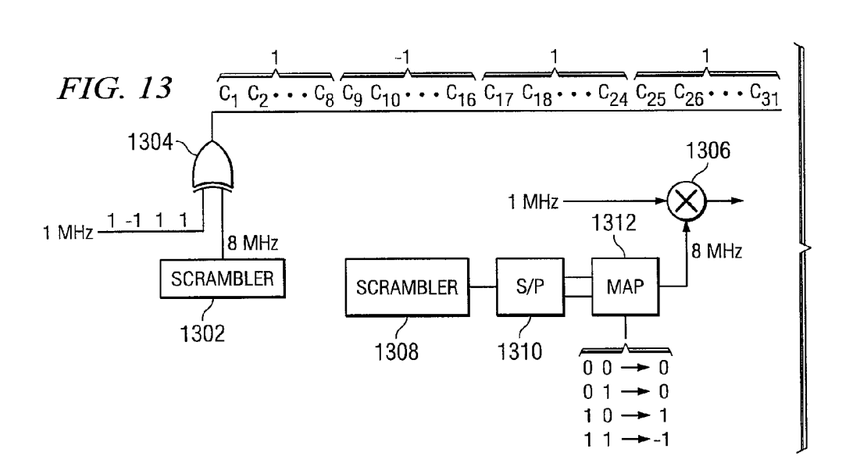
FIG. 13 is a diagram illustrating a modulation technique that can employed in a system that uses the packet structure of FIG. 1 in accordance with another embodiment.

Once a device has acquired a piconet, the payload, or data, must be demodulated and decoded. FIGS. 12 and 13 illustrate two example methods for modulating data included in a packet structure as described herein. In FIG. 12, an example of the first modulation technique is illustrated that makes use of a cyclically shifted code of length 31. In the example illustrated the code is cyclically shifted by 8 bits. It should be noted that the cyclic-shifting can be left or right. The code and the cyclically shifted versions of the code are then used to code 2 bits per code (b1 b2).

In other words, an unshifted version of the code can be used to represent 2 bits each of which are zeroes, i.e., "0" "0". The first cyclically shifted version of the code, i.e., one that starts with the $9^{th}$ bit of the code can then be used to represent "0" "1", the next cyclically shifted version of the code can be used to represent "1" "1", and the final cyclically shifted version of the code can be use to represent the bit combination "1" "0". The bit combinations of the corresponding code are illustrated in FIG. 12, to the right of this mapping is shown the resulting position of the auto-correlation function in the receiver. The receiver can then simply look at the position of the auto-correlation peak and map that position to the appropriate bit combination. In other words, if the receiver sees an auto-correlation peak in the $1^{st}$ position, then the receiver can map this to the bit combination "0" "0". If the peak is in the last position, then the receiver can map this to the bit combination "0" "1", if the peak is in the second to the last position then the receiver can map this to the bit combination "1" "1", and if the peak bit is in the $2^{nd}$ position then the receiver can map this to the bit combination "1" "0". If the code is cyclically shifted in the other direction, i.e., to the left, then the positions of the auto-correlation peaks will change accordingly.

The decision to use 8-bit cyclical shifts is based on the delay spread associated with multi-paths. If the auto-correlation peak positions are too close together, i.e., within the delay spread, then there will be multi-path interference with detection of subsequent positions. If, however, the delay spread is known, then it may be possible to shift by less bits. For example, if the delay spread is relatively short, it maybe possible to use 4-bit cyclical shifting and thus encode more bits per code. On the other hand, cyclically shifting by a greater number of bits, e.g., 16, is also a possibility.

Using the 8-bit cyclical shift described above, it is also possible for coherent receivers to encode an extra bit. This can be done by using an extra bit for the sign. In other words, if a negative version of a given code is sent, then this can be used to convey an extra bit of information as illustrated in the bottom half of FIG. 12. Because non-coherent receivers do not detect negative values, however, this technique does not work for non-coherent receivers.

FIG. 13 illustrates a second example modulation scheme in accordance with one embodiment of the systems and methods described herein. Here, the codes are used to spread the data. Spreading using codes is well known and will not be described herein; however, it should be noted that spreading using fixed codes is not necessarily optimal. This is because two codes can have relatively high cross-correlation, which will result in relatively high interference. Because codes are fixed, this relatively high interference cannot be mitigated.

To address this issue, the second example modulation scheme, illustrated in FIG. 13, can use a scrambler 1302 to randomize the code used for spreading. The data is then spread, e.g., via an exclusive-OR circuit 1304. In the example of FIG. 13, 8 bits of the scrambled code are used to scrambled each bit of data. Each bit will be spread using a different 8-bit code. If a bit from piconet 1 has high correlation with a bit from piconet 2, then there will be relatively high interference. But the next bits from each piconet will be spread with different random codes and should have lower cross-correlation and lower interference.

As illustrated in the lower half of FIG. 13, the code can be scrambled in scrambler 1308, then converted into parallel code streams in serial-to-parallel converter 1310. The parallel code streams can then be mapped to a bit in mapping circuit 1312. The mapped code can then be used to spread the data in multiplier 1306.

Figure 14:
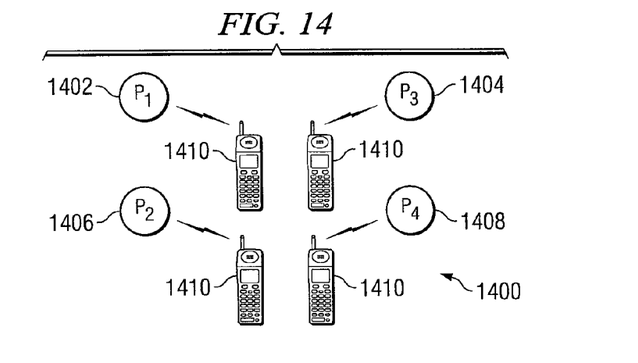
FIG. 14 is a diagram illustrating an example system that used the packet structure of FIG. 1 in accordance with one embodiment.

FIG. 14 is a diagram illustrating an example UWB system 1400 comprising four piconets 1402, 1404, 1406, and 1408 in communication with a plurality of UWB remote devices 1410. Remote devices 1410 will often be mobile communication devices coming into and out of range of piconets 1402, 1404, 1406, and 1408. To allow piconets 1402, 1404, 1406, and 1408 to use the same frequency but limit interference, piconets 1402, 1404, 1406, and 1408 can be configured to use a code generated as described above. Piconets 1402, 1404, 1406, and 1408 and devices 1410 can use the modulation techniques illustrated in FIG. 12 or 13.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed:

1. A method for wireless data communication, comprising:
   generating a preamble code for a preamble of a frame to be transmitted to a wireless communication device, wherein the preamble code exhibits perfect periodic auto-correlation and optimum periodic cross-correlation in a wireless communication system, the cross-correlation results in a peak that is no larger than a square root of a peak of the auto-correlation, and the preamble code is generated by a circuit that:
   selects preferred pairs of maximum length sequences of a length $2^N-1$, wherein N is an odd number;
   modifies the periodic cross-correlation values for the selected preferred pairs of maximum length sequences by adding 1 to the periodic cross-correlation values; and
   divides the modified periodic cross-correlation values by $2^{(N+1)/2}$.

2. The method of claim 1, wherein the periodic cross-correlation for the selected pairs of maximum length sequences is a 3 level signal.

3. The method of claim 1, wherein N=5.

4. The method of claim 1, wherein N=7.

5. The method of claim 1, further comprising using the selected pairs of maximum length sequences to generate perfect ternary sequences with perfect periodic auto-correlation and optimum periodic cross-correlation.

6. An apparatus for wireless communication, comprising:
   a circuit configured to generate a frame for transmission to a wireless communication device, the frame comprising a preamble, a header and a payload, wherein the preamble comprises a sync portion and a stop frame delimiter, the sync portion and the stop frame delimiter formed from a code, the code exhibits perfect periodic auto-correlation and optimum periodic cross-correlation, the cross-correlation results in a peak that is no larger than a square root of a peak of the auto-correlation, and the code is formed by:

selecting preferred pairs of maximum length sequences of a length $2^N-1$, wherein N is an odd number, modifying the periodic cross-correlation values for the selected preferred pairs of maximum length sequences by adding 1 to the periodic cross-correlation values, and dividing the modified periodic cross-correlation values by $2^{(N+1)/2}$.

7. The apparatus of claim 6, wherein the periodic cross-correlation for the selected pairs of maximum length sequences is a 3 level signal.

8. The apparatus of claim 6, wherein N=5.

9. The apparatus of claim 6, wherein N=7.

10. The apparatus of claim 6, wherein the selected pairs of maximum length sequences are used to generate perfect ternary sequences with perfect periodic auto-correlation and optimum periodic cross-correlation.

11. The apparatus of claim 6, wherein the sync portion is created by repeating the code a certain number of times.

12. The apparatus of claim 11, wherein the sync portion is created by repeating positive or negative versions of the code a certain number of times.

13. The apparatus of claim 6, wherein the stop frame delimiter is constructed by using zeroes, the code, or negative versions of the code.

14. The apparatus of claim 6, wherein the preamble comprises a equal number of negative and positive versions of the code.

15. The apparatus of claim 6, wherein the code comprises half zeroes.

16. The method of claim 1, further comprising creating a sync portion of the preamble by repeating the code a certain number of times.

17. The method of claim 16, wherein the sync portion is created by repeating positive or negative versions of the code a certain number of times.

18. The method of claim 1, further comprising constructing a stop frame delimiter of the preamble by using zeroes, the code, or negative versions of the code.

19. The method of claim 1, wherein the preamble comprises an equal number of negative and positive versions of the code.

20. The method of claim 1, further comprising transmitting the frame to the wireless communication device.

21. The apparatus of claim 1, further comprising a transmitter configured to transmit the frame to the wireless communication device.

22. A wireless communication device, comprising:

a circuit configured to generate a frame for transmission, the frame comprising a preamble, a header and a payload, wherein the preamble is formed from a code that exhibits perfect periodic auto-correlation and optimum periodic cross-correlation, the cross-correlation results in a peak that is no larger than a square root of a peak of the auto-correlation, and the code is formed by:

selecting preferred pairs of maximum length, sequences of a length $2^N-1$, wherein N is an odd number, modifying the periodic cross-correlation values for the selected preferred pairs of maximum length sequences by adding 1 to the periodic cross-correlation values, and dividing the modified periodic cross-correlation values by $2^{(N+1)/2}$;

an antenna; and a transmitter configured to transmit the frame via the antenna.

23. The wireless communication device of claim 22, wherein the transmitter comprises an impulse transmitter configured to transmit the frame in short, pulses.

* * * * *